US012555571B2

(12) United States Patent
Venkateswaran et al.

(10) Patent No.: US 12,555,571 B2
(45) Date of Patent: Feb. 17, 2026

(54) SYNTHESIS OF PERSONALIZED CONVERSATIONAL AUTOMATION AGENTS

(71) Applicant: INTERNATIONAL BUSINESS MACHINES CORPORATION, Armonk, NY (US)

(72) Inventors: Praveen Venkateswaran, Cambridge, MA (US); Nigel Steven Fernandez, Sunderland, MA (US); Yara Rizk, Cambridge, MA (US); Vatche Isahagian, Belmont, MA (US); Vinod Muthusamy, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 274 days.

(21) Appl. No.: 18/062,691

(22) Filed: Dec. 7, 2022

(65) Prior Publication Data
US 2024/0194194 A1 Jun. 13, 2024

(51) Int. Cl.
*G10L 15/22* (2006.01)
*G10L 15/06* (2013.01)
*G10L 15/18* (2013.01)

(52) U.S. Cl.
CPC ........ *G10L 15/1815* (2013.01); *G10L 15/063* (2013.01); *G10L 15/22* (2013.01); *G10L 2015/0635* (2013.01); *G10L 2015/223* (2013.01)

(58) Field of Classification Search
CPC .................................................... G10L 15/22
See application file for complete search history.

(56) References Cited

U.S. PATENT DOCUMENTS

| 10,402,501 | B2 | 9/2019 | Wang |
| 10,977,452 | B2 | 4/2021 | Wang |
| 11,206,229 | B2 | 12/2021 | Singaraju |
| 2018/0314689 | A1 | 11/2018 | Wang |
| 2019/0130904 | A1* | 5/2019 | Homma ................. G06N 3/088 |
| 2019/0332680 | A1 | 10/2019 | Wang |
| 2020/0137230 | A1* | 4/2020 | Spohrer ............. H04M 7/0027 |
| 2020/0344185 | A1 | 10/2020 | Singaraju |

(Continued)

OTHER PUBLICATIONS

Chen, Yanda, et al. "Meta-learning via language model in-context tuning." arXiv preprint arXiv:2110.07814 (2021). (Year: 2021).*

(Continued)

*Primary Examiner* — Jialong He
(74) *Attorney, Agent, or Firm* — Robert D. Bean

(57) ABSTRACT

According to one embodiment, a method, computer system, and computer program product for software agent synthesis is provided. The present invention may include generating one or more training examples from historical data and software agents; training, using the on the one or more training examples, a language model to synthesize a software agent based on a natural language input from a user; monitoring, using one or more input devices, for one or more natural language user inputs; responsive to identifying one or more natural language user inputs, synthesizing, using the trained language model, one or more software agents based on the one or more natural language user inputs; execute the one or more new software agents to carry out one or more tasks invoked by the one or more natural language user inputs.

17 Claims, 2 Drawing Sheets

(56) References Cited

U.S. PATENT DOCUMENTS

| | | | |
|---|---|---|---|
| 2020/0395008 A1 | 12/2020 | Cohen | |
| 2021/0097978 A1* | 4/2021 | Mei | G10L 15/183 |
| 2021/0304056 A1* | 9/2021 | Qi | G06F 17/00 |
| 2022/0255885 A1* | 8/2022 | Aharoni | G10L 15/22 |
| 2022/0382745 A1* | 12/2022 | Rodrigues | G06F 16/2379 |
| 2024/0020096 A1* | 1/2024 | Chen | G06F 40/30 |

OTHER PUBLICATIONS

Chen, Mark, et al. "Evaluating large language models trained on code." arXiv preprint arXiv:2107.03374 (2021). (Year: 2021).*

Feng, Zhangyin, et al. "Codebert: A pre-trained model for programming and natural languages." arXiv preprint arXiv:2002.08155 (2020). (Year: 2020).*

Xu, Frank F., et al. "Incorporating external knowledge through pre-training for natural language to code generation." arXiv preprint arXiv:2004.09015 (2020). (Year: 2020).*

Daga, et al., "Domain-Specific Language Model Using Domain Literature and Experts' Spoken Language," IP.com, Oct. 20, 2017, 11 pages, Cisco Systems, Inc., IP.com No. IPCOM000251170D, Retrieved from the Internet: <URL: https://priorart.ip.com/IPCOM/000251170>.

Desmond, et al., "A No-Code Low-Code Paradigm for Authoring Business Automations Using Natural Language," AI in Automation [project], Jul. 15, 2022, 8 pages, ResearchGate, arXiv:2207.10648v1, Retrieved from the Internet: <URL: https://www.researchgate.net/publication/362173402_A_No-Code_Low-Code_Paradigm_for_Authoring_Business_Automations_Using_Natural_Language>.

Disclosed Anonymously, "Cross Lingual Human Agent Assistance Searching Historical Logs," IP.com, Apr. 14, 2021, 5 pages, IP.com No. IPCOM000265475D, Retrieved from the Internet: <URL: https://priorart.ip.com/IPCOM/000265475>.

Disclosed Anonymously, "System and Method for Process Document Generation," IP.com, Dec. 20, 2021, 8 pages, IP.com No. IPCOM000268048D, Retrieved from the Internet: <URL: https://priorart.ip.com/IPCOM/000268048>.

Mazaré, et al., "Training Millions of Personalized Dialogue Agents," CoRR [journal], Sep. 6, 2018, 5 pages, arXiv:1809.01984v1, Retrieved from the Internet: <URL: <https://arxiv.org/abs/1809.01984>.

Poesia, et al., "Synchromesh: Reliable code generation from pre-trained language models," CoRR [journal], Jan. 26, 2022, 19 pages, arXiv:2201.11227v1, Retrieved from the Internet: <URL: https://arxiv.org/abs/2201.11227>.

Raju, et al., "Contextual Language Model Adaptation for Conversational Agents," CoRR [journal], Jul. 31, 2018, 5 pages, arXiv:1806.10215v4, Retrieved from the Internet: <URL: https://arxiv.org/abs/1806.10215>.

Sun, et al., "TreeGen: A Tree-Based Transformer Architecture for Code Generation," Proceedings of the AAAI Conference on Artificial Intelligence (AAAI-20), Apr. 2020, pp. 8984-8991, vol. 34, No. 05, DOI: 10.1609/aaai.v34i05.6430, Retrieved from the Internet: <URL: https://ojs.aaai.org/index.php/AAAI/article/view/6430>.

Zaib, et al., "A Short Survey of Pre-trained Language Models for Conversational AI—A NewAge in NLP," CoRR [journal], Apr. 22, 2021, 7 pages, arXiv:2104.10810v1, Retrieved from the Internet: <URL: https://arxiv.org/abs/2104.10810>.

Zhang, et al., "Personalizing Dialogue Agents: I have a dog, do you have pets too?" CoRR [journal], Sep. 25, 2018, 16 pages, arXiv:1801.07243v5, Retrieved from the Internet: <URL: https://arxiv.org/abs/1801.07243>.

* cited by examiner

SYNTHESIS OF PERSONALIZED CONVERSATIONAL AUTOMATION AGENTS

BACKGROUND

The present invention relates, generally, to the field of computing, and more particularly to conversational agents.

The field pertaining to conversational agents, or dialogue systems, may be concerned with the development of computer systems designed to converse with a living human. Dialogue systems may use one or more of text, speech, graphics, haptics, gestures, and other modes of communication on both the input and output channel. As computing devices become ubiquitous in our everyday lives, the interface between humans and computing devices is no longer relevant only to the dedicated subset of the populace that works with computers, but to society at large. Facilitating casual interactions between man and machine therefore stands to yield great cumulative advantages in the speed and efficiency with which individuals interface with the many computing devices in their everyday lives.

SUMMARY

According to one embodiment, a method, computer system, and computer program product for software agent synthesis is provided. The present invention may include generating one or more training examples from historical data and software agents; training, using the on the one or more training examples, a language model to synthesize a software agent based on a natural language input from a user; monitoring, using one or more input devices, for one or more natural language user inputs; responsive to identifying one or more natural language user inputs, synthesizing, using the trained language model, one or more software agents based on the one or more natural language user inputs; execute the one or more new software agents to carry out one or more tasks invoked by the one or more natural language user inputs.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Figure 1:
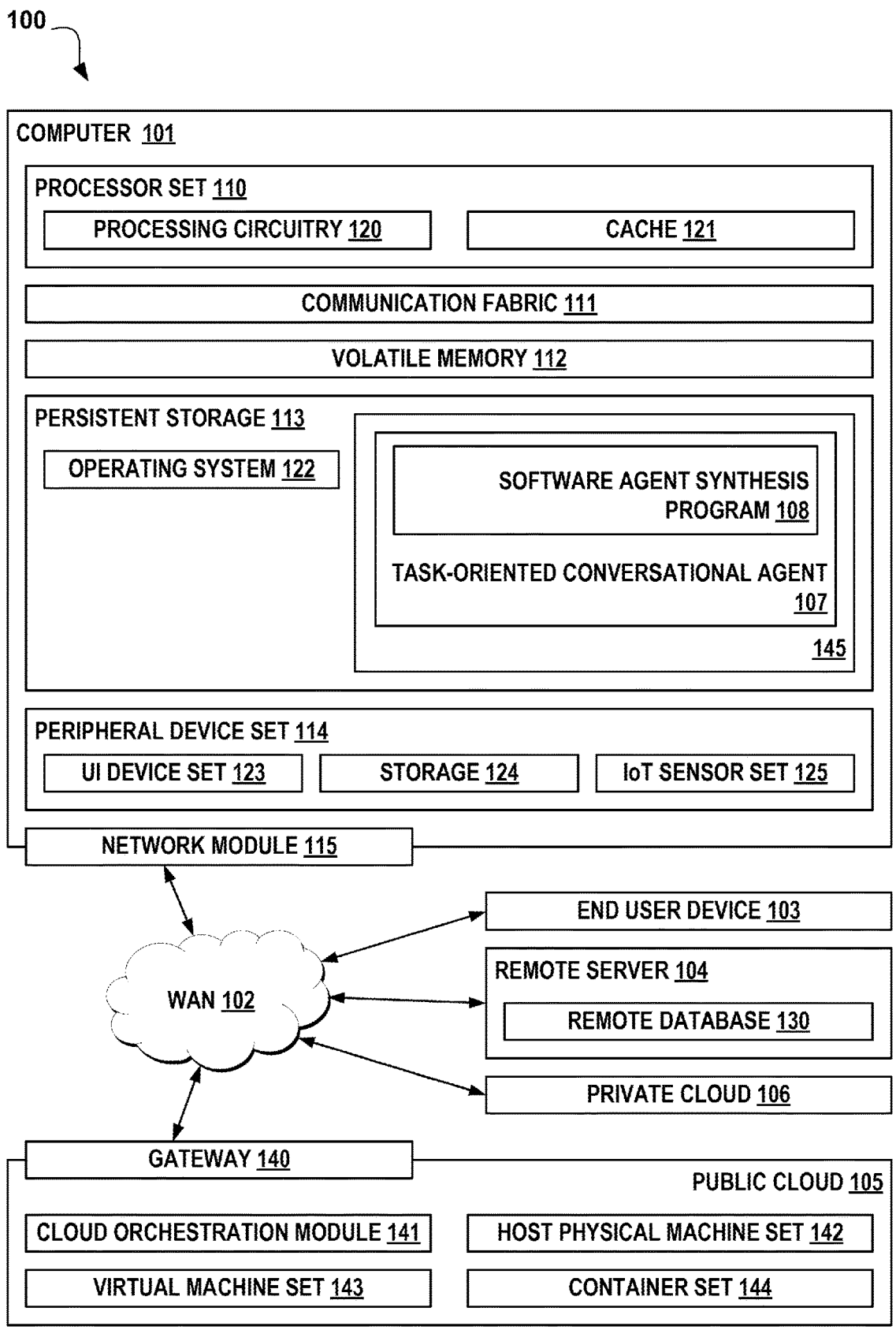
FIG. 1 illustrates an exemplary networked computer environment according to at least one embodiment.

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. In the description, details of well-known features and techniques may be omitted to avoid unnecessarily obscuring the presented embodiments.

Embodiments of the present invention relate to the field of computing, and more particularly to conversational agents. The following described exemplary embodiments provide a system, method, and program product to, among other things, synthesize new software agents based on natural language commands.

As previously described, the field pertaining to conversational agents, or dialogue systems, may be concerned with the development of computer systems designed to converse with a living human. Dialogue systems may use one or more of text, speech, graphics, haptics, gestures, and other modes of communication on both the input and output channel. Dialogue systems comprise a set of components that perform several key functions. Responsibility for performing these key functions may be divided up among the components differently in different dialogue systems, but these functionalities may include input recognition, natural language understanding, dialogue management, task management, output generation, and output rendering. Input recognition is responsible for converting communications from a user into plain text. Natural language understanding is responsible for analyzing the plain text and extracting the text's semantic meaning. Dialogue management keeps the history and state of the dialogue and manages the general flow of the conversation based on the semantic meaning. Task management is responsible for executing tasks within a specific task domain. Output generation creates output in the form of a message to be communicated to the user. Lastly, output rendering is concerned with utilizing available hardware to render the created message in the real world and communicate the message to the user.

A subset of dialogue systems, called "task-oriented conversational agents," are dialogue systems capable of conversing with a human but which are further equipped to offer a functional support service to a user; task-oriented conversational agents may possess the functionality to assist with troubleshooting, interact with web services on behalf of users (e.g. performing online shopping, booking flights online, retrieving data, et cetera), talk users through automated telephone system menus, and more. Task-oriented conversational agents may comprise one or more software agents that are software programs that are specialized for a particular purpose, such as handling communications with the user regarding booking a flight, making a reservation at a restaurant, buying a product, operating a machine, et cetera; the software agents wait for a particular trigger, and once that trigger is detected, the software agents execute a task or series of tasks to fulfil their assigned purpose. In some instances, a task-oriented conversational agent may employ a bundle of multiple different software agents in order to enable a broader range of capabilities of the task-oriented conversational agent.

However, task-oriented conversational agents still face significant operational challenges. Currently, existing offerings of task-oriented conversational agents in the art provide a fixed set of agents with rigid and difficult-to-modify automation skills. In such existing offerings, a human developer on the system side may create the software agents at design time before a user can use the software agent at run time. There is a time lag between both phases, which means that if a user desires a software agent with a new or modified functionality, that user must wait, sometimes for months, to be able to use a desired software agent. As a result, the initial suite of software agents and their associated skills available at runtime represent the full measure of the task-oriented conversational agent's capabilities; the task-oriented conversational agent is simply incapable of performing any task that falls outside of the bounds of these capabilities until these tasks have been accommodated by a developer during a subsequent design phase. This results in task-oriented conversational agents that cannot adapt to new and unfamiliar user utterances comprising new and unfamiliar tasks, queries, desired user functionalities, et cetera during runtime; the modifications must first be implemented by human developers during design time, the task-oriented conversational agent shut down, the modifications patched into the task oriented conversational agent, and the task-oriented conversational agent re-started. This state of affairs results in significant lag times and service interruptions between a user desiring a new or modified functionality and the task-oriented conversational agent accommodating the desired functionality.

Furthermore, use of multiple separate software agents for related tasks results in inefficiencies during interactions with the user. For instance, complex tasks that comprise multiple smaller tasks, each of which is carried out by a different software agent, requires that each of the different software agent be separately invoked; this results in each separate software agent requiring the user to provide the input necessary to perform its subtask, even where many of the inputs are the same. This in turn results in a situation where the user must provide multiple redundant inputs to the task-oriented conversational agent in order to perform the requested task. As an example, an airline's dialogue system may comprise three separate software agents: a flight-booking agent, a hotel-booking agent, and a car-renting agent. In a situation where a user wants to book a flight, a hotel, and a car through the dialogue system of the airline, the user may have to invoke each agent individually, saying "I wish to book a flight" to invoke the flight-booking agent, saying "also, please book me a hotel," to invoke the hotel-booking agent, and saying "book a rental car too" to invoke the car-renting agent. For each agent, the user may need to separately provide information such as trip dates, origin city, destination city, et cetera, which may require the user to provide the same information multiple times in one conversation.

Another challenge is that since software agents are designed to execute particular tasks or functionalities, software agents cannot be personalized to tailor the execution of the task or functionality to the preferences or constraints associated with a particular user. For example, a user may prefer that a task be carried out in a particular way or using particular default inputs that can be automatically entered for the user, or the user is subject to certain constraints in the performance of the task. However, preferences or constraints of the user that would require modifying how a task is carried out by the software agent cannot be accommodated during runtime, nor can they typically be accommodated in design time, because tailoring a software agent to a user's specific needs renders the tailored software agent only suitable for use by that user and/or similar users, which may be an inefficient and undesirable use of human developers' limited time and energy during design time.

Challenges such as the above could possibly be resolved if the user was capable of modifying the software agents. However, the software agents are embodied in code which usually can only be modified by manually altering and rewriting it during design time. As such, modifying the software agents may require programming expertise and domain knowledge that is too laborious and time-intensive to be performed on the fly, and so technical a task as to be impossible for the majority of users interacting with the task-oriented conversational agent.

As such, it may be advantageous to, among other things, implement a system that trains and fine-tunes a single language model which does not have parallel run-time and design-time phases, and which is capable of accepting natural language queries or commands from a user as well as preferences of the user and synthesizing new software agent during runtime based on the preferences and the natural language query or command. Therefore, the present embodiment has the capacity to improve the technical field of conversational agents by providing an accessible and intuitive way for an ordinary user lacking in programming knowledge to modify, during runtime and in real-time, software agents; this in turn eliminates the need for redundant or repetitive inputs from a user, enables the task-oriented conversational agent to assimilate preference information in performing a task, enables the task-oriented conversational agent to adapt to and execute queries and tasks for which it wasn't originally programmed, and expands the capabilities of task-oriented conversational agents by creating new agents during runtime which are adapted to the needs of the user and which may be shared with other task-oriented conversational agents to improve the breadth of their functionality as well, all without the need for a human operator on the system side during runtime nor any design phase after the initial training phase; as such, the present embodiment has the capacity to improve the field of conversational agents by improving the user's experience, improving the efficiency of interactions between the user and the task-oriented conversational agent, improving the capability of the task-oriented conversational agent, and reducing operational costs and chances of human error of the task-oriented conversational agent.

According to at least one embodiment, the invention is a system and method of training a language model to translate natural language user input to software agent code, and, responsive to receiving a user input, synthesizing a new software agent based on the natural language user input and an output of the trained language model.

In some embodiments of the invention, software agents may be computer programs that act with some measure of autonomy to accomplish tasks on behalf of the task-oriented conversation agent of which they are subcomponents. The software agents may be specialized to perform one or more particular tasks, which may comprise structured and/or repetitive processes. The software agents may be associated with a natural language word, phrase, and/or context, and may be invoked, or activated, when the conversation agent identifies the associated natural language word, phrase, and/or context within a user input. Once invoked, a software agent will run and execute its allotted task or combination of allotted tasks. As computer programs, software agents comprise code, and may be written in a domain-specific programming language such as YAML. While software agents and training examples thereof may be described herein as comprising YAML code, YAML is provided only as an example of a possible language that software agents could be written in, and one skilled in the art would recognize that software agents and training examples may be written in any suitable domain-specific language, such as XML, SGML, et cetera.

In some embodiments of the invention, the system may receive user utterances via one or more input devices; the input devices may be one or more electronic sensors capable of measuring and recording natural language communicated by a user. Natural language may be any language that has evolved naturally in humans through use and repetition without conscious planning or premeditation, as opposed to constructed and formal languages devised for a specific purpose, such as programming computers or studying logic; natural languages may comprise gestures, sign language, spoken and written speech, et cetera. User utterances, or user input, may comprise discrete natural language communications articulating a command, instruction, or query making a demand or request to the system, and which are received by the system from the user. A dialogue comprising multiple user utterances and associated responses from the system may be herein referred to as a conversation. The sensors may comprise microphones for recording audible speech, cameras for recording gestures or signs, tablets or capacitive touchscreens for recording touch including writing, keyboards for recording text input, et cetera.

In some embodiments of the invention, the language model may be a machine learning model for translating natural language utterances into agent automation descriptions. In some embodiments, the language model may be a deep neural network comprising many layers of neurons. The neurons may comprise weights, or parameters, that need to be learned and which may be learned by showing the language model many training samples and continuously updating the weights as the language model iterates through the training data and makes incorrect predictions as compared to the ground truth data it has seen. In some embodiments of the invention, the language model may not initially differ from some existing machine learning models from an architecture perspective, but the language model may learn different weights based on the training data it will see and the task it has to train for, and may thereby grow into a unique permutation of an existing machine learning model.

In some embodiments of the invention, the language model may comprise a natural-language-based no-code front end connected to a target automation language backend via an intermediate language. The intermediate language may be any domain-specific language, such as YAML, that is easy to understand, review, and validate by the target user; the intermediate language may serve to bridge the semantic gap between the user's natural language input specification and the low-level automation code. Intermediate language domain keywords and abstractions bear more resemblance to natural language. Due to their resemblance to natural language, code written in an intermediate language may be easier to read and understand than automation code. However, learning to write code in an intermediate language is conceptually not any easier than learning other domain specific programming languages. Thus, intermediate language code is generally not easy to write from scratch. The intermediate language provides several important advantages: First, it enables the rapid construction of learned natural language to intermediate language mappings based on emerging technology in language foundation models. Second, as an easy-to-read language, it provides a user-friendly interface for the user to review and validate whether they achieved what the user had in mind. Third, as a domain specific programming language, it facilitates the construction of source-to-source transformation, or transpilation, to the underlying automation code using traditional compiler technology.

The language model may be initially trained during the training phase with historical user utterances, code of existing software agents, and metadata. Metadata may comprise any data associated with a user that affects how a software agent may execute a task for that user, such as constraints and/or preferences associated with that user. Preferences may include likes and dislikes of a user, and constraints may include limitations applicable to the user, which, for example, may modify what inputs may be automatically provided to a software agent, the scope of a task performed by the software agent, which software agent may be invoked by the user utterance, et cetera. For example, a constraint may be that the user, as a travel agent, cannot use the corporate travel website in booking a flight for a personal vacation, which may restrict a flight-booking software agent from accessing the corporate travel website in performing a flight-booking task for the user. Metadata may comprise a user profile, which may in turn comprise preferences and/or constraints. In some embodiments of the invention, the training phase may be a stage of operation independent of the inference phase during which the system trains the language model by providing input parameters and sanitized data; the system provides training data as inputs until the output satisfies some threshold accuracy, at which point the training step is over.

In some embodiments of the invention, the system may train the language model on YAML training examples; the system may create YAML training examples from historical logs of actual users, and publicly available YAML files (git repositories) comprising the code of one or more software agents; the system may transform the phrases that invoke the software agents, or invocation phrases, into natural language sentences varying in complexity and in number/type of software agents invoked to provide a range of complex user queries. The system may pair these natural language sentences with the YAML code of the software agent or agents the natural language sentences invoke and input these pairs to the language model as training examples. In some embodiments of the invention, the system may create such training examples using a synthesis example generator, which may be anything from a rule-based machine-learning model that combines various agents to form a new agent, to more sophisticated generators that leverage generative artificial neural networks. The system may additionally or alternatively create YAML training examples using handcrafted prompts to provide additional coverage of automation use-cases. Handcrafted prompts may be one-time examples that are created by human developers prior to the training phase and inference phase which are solely designed to aid the language model during the training phase in arriving at accurate inferences.

The inference phase, or runtime, may be a stage of operation after the training phase during which the system is "live," receives new user utterances, and acts upon them in real-time. During the inference phase, the system may monitor, using sensors, for new user utterances in real-time or near-real-time. Upon detecting a user utterance, the system may provide the user utterance as input to the language model. The language model may parse the input utterance to understand its semantic meaning, recognize the intent of the user, parse out the language entities including any potential new invocation phrases comprising the utterance, and then map the entities and intent to an internal representation that allows the language model to infer what functionality the user desires and create a YAML file for an agent that performs the desired functionality. In other words, synthesizing a new software agent may comprise passing user prompts for personalization through the language model to obtain new software agent definitions. In some embodiments, the language model may synthesize software agents by making minor changes to existing software agents, and/or by combining two or more existing software agents;

where the language model needs to make minor changes to the software agent, the language model may be able to identify and perform those changes where the language model has seen similar examples of such changes in its training data. While developers may have initially created the building blocks of the software agent synthesis system at some point prior to runtime, in the form of the existing software agents, the language model may refine and personalize these software agents during runtime given a user's description of said software agent without needing a human developer or design phase to create it.

In some embodiments, the system may identify the user from which the user utterance originated, for example by facial recognition coupled with acoustic source detection, voice identification, passwords, prompts, et cetera, and may retrieve a profile associated with the identified user which is provided to the language model as input along with the user utterance. When a new software agent is synthesized, the system may prompt the user for an invocation phrase to associate with the newly synthesized software agent. Responsive to the user providing the invocation phrase, the system may store the newly synthesized software agent and its associated invocation phrase in a repository of software agents. In some embodiments of the invention, the system may associate the newly synthesized software agent with the user for whom it was created, or author user, for example by appending metadata to the newly synthesized software agent specifying the author user, or by storing the newly synthesized software agent in a repository associated with the author user. In some embodiments of the invention, synthesized software agents associated with an author user may be shared or otherwise made available to one or more users besides the author user.

In some embodiments of the invention, for example after the initial training phase, the language model may be subjected to additional training phases. These may occur in parallel to the inference phase, but the inference phase must be interrupted by stopping and restarting the program to integrate the results of the additional training phase with the language model. The language model may be trained using new user utterances, metadata, the software agent code synthesized from the new user utterances and the metadata, and/or feedback from a human user. In some embodiments, respectively, the system may train and fine-tune the language model using a mixture of in-context and prompt driven learning, while also utilizing memory and/or a database for storing metadata. In-context learning may require the training data to be available during the training phase while in prompt-based learning, the data has to be present during runtime. In-context learning may be able to handle more data than prompt-based learning, which has a character limit. These two types of learning result in different parameters for the language model which in turn influences the predictions that the language model makes, and therefore the accuracy of its output. In some embodiments, additional training may occur during the inference phase, although training occurring during the inference phase may necessarily lack feedback from a human user and may comprise prompt-based learning.

In some embodiments of the invention, the system may respond to the user utterance using natural language. The system may operate or be integrated with one or more output devices, which may comprise a number of devices for communicating natural language to the user. These output devices may include speakers for communicating audible speech, display devices for communicating written speech or reproducing gestures or sign languages, haptic vibration motors or other vibration devices for generating haptic feedback, or a robotic hand for reproducing gestures or sign languages. The system may respond to the user utterance in the same format as the user utterance. For example, if the user utterance comprised audible speech, the system may respond with audible speech. If the user utterance comprised sign language, the system may respond in sign language. The system may utilize the output generation functionality of the task-oriented conversational agent to create the output and may utilize the output rendering functionality to render the created response in the real world and communicate the message to the user.

In an exemplary implementation of the system, an airline's dialogue system utilizing the present invention may comprise three separate software agents: a flight-booking agent, a hotel-booking agent, and a car-renting agent. In a situation where a user wants to book a flight, a hotel, and a car through the dialogue system of the airline, the user may state "save my preferred departure destination as Boston." The system may then save Boston to the user's profile as a departure destination. The user may then say "I want to book a flight to New York on January 13$^{th}$. Book me a hotel and rental car for three days." The system may first query the user profile for additional preference information and find that the user's preferred departure destination is Boston, as specified earlier by the user. The system may then identify the three agents invoked by the user's input, namely the flight-booking agent, a hotel-booking agent, and a car-renting agent, and may identify that a new agent may be synthesized which combines the functionality of the three agents; the system may execute the three agents, and then output the following message, "I have booked a flight, booked a hotel, and rented a car. Would you like to save this as an automation? If so, when should I execute it?" The user may reply "Yes, whenever I book a trip." In response, the system may synthesize code describing a single agent combining the functionalities of booking a flight, booking a hotel, and renting a car, and may save that synthesized agent with metadata specifying that the synthesized agent is to be invoked by the phrase "book a trip." Lastly, the system may output the message, "Agent created."

In an exemplary implementation of the system, the language model may be provided with the following training data during the training phase: a first user prompt "I want to approve requests to a specific conference," paired with a first software agent code invoked by the user prompt, which, when executed, approves requests to a user-specified conference, and which may appear as follows:

```
<begin YAML>
actuator:
  pipeline:
  - skill: verdi.skills.misc.if_else
    name: wa_extract
    args:
      if:
        -predicate: "_skill_case == 'approveByConf'"
        result:
          action: "Approval"
          past-tense-action: "Approved"
          query_value: "$._entities.conference"
          query_operator: "StartsWith"
          query_field: "Event"
<end YAML>
```

The language model may further be provided with a second user prompt. "I want to approve requests from a specific manager." paired with a second software agent code invoked by the user prompt, which, when executed, approves requests from a user-specified manager, and which may appear as follows:

```
<begin YAML>
actuator:
  pipeline:
  - skill: verdi.skills.misc.if_else
    name: wa_extract
    args:
      if:
        -predicate: "_skill_case == 'approveRequestsByManager'"
        result:
          action: "Approval"
          past-tense-action: "Approved"
          query_value: "$._entities.[sys-person,managers][0]"
          query_operator: "Equals"
          query_field: "Manager_name"
<end YAML>
```

The language model may further be provided with metadata comprising a user profile, which may appear as follows:

```
[
  {
    "user_id": "23124",
    "preferences": [
      {
        "departure_city": "Boston",
        "preferred_airlines": "Lichtenstein_Airways"
        "red_eye_acceptable": "False"
      }
    ]
  }
]
```

During the inference phase, the system may receive the following input from a user: "create an agent to reject requests to a specific conference or from a specific manager." The system has not previously seen or encountered the word "reject." Utilizing the language model, the system extracts the meaning and syntax of "reject," and identifies that the user prompt invokes two software agents, the first software agent and the second software agent. The system accordingly combines the code of the first software agent and the second software agent, and modifies code of the respective software agents to reflect the syntax of the term "reject," thereby creating a first synthesized software agent comprising code that may appears as follows:

```
<begin YAML>
actuator:
  pipeline:
  - skill: verdi.skills.misc.if_else
    name: wa_extract
    args:
      if:
        -predicate: "_skill_case == 'rejectByConf'"
        result:
          action: "Rejection"
          past-tense-action: "Rejected"
          query_value: "$._entities.conference"
          query_operator: "StartsWith"
          query_field: "Event"
        -predicate: "_skill_case == 'rejectByManager'"
        result:
          action: "Rejection"
          past-tense-action: "Rejected"
          query_value: "$._entities.[sys-person,managers][0]"
          query_operator: "Equals"
          query_field: "Manager_name"
<end YAML>
```

The system may then receive the following input from a user: "create an agent to reject requests from a specific manager and to a specific conference." Due to the relatively complex "and" composition of the query, the first and second software agents are invoked in a particular order, but the first synthesized software agent is not invoked. The system therefore utilizes the newly inferred meaning of the term "reject" and the first and second software agents to create a second synthesized software agent combining the functionality of the first and second software agents, comprising code that may appear as follows:

```
<begin YAML>
actuator:
  pipeline:
  - skill: verdi.skills.misc.if_else
    name: wa_extract
    args:
      if:
        -predicate: "_skill_case == 'rejectByConfAndManager'"
        result:
          action: "Rejection"
          past-tense-action: "Rejected"
          query_value: "$._entities.conference"
          query_operator: "StartsWith"
          query_field: "Event"
          query_value2: "$._entities.[sys-person,managers][0]"
          query_operator2: "Equals"
          query_field2: "Manager_name"
<end YAML>
```

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation, or garbage collection, but this does not render the storage device as transitory because the data is not transitory while it is stored.

The following described exemplary embodiments provide a system, method, and program product to synthesize new software agents based on natural language commands.

Referring now to FIG. 1, computing environment 100 contains an example of an environment for the execution of at least some of the computer code involved in performing the inventive methods, such as code block 145, which may comprise task-oriented conversational agent 107 and software agent synthesis program 108. In addition to code block 145, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and code block 145, as identified above), peripheral device set 114 (including user interface (UI), device set 123, storage 124, and Internet of Things (IOT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in code block 145 in persistent storage 113.

COMMUNICATION FABRIC 111 is the signal conduction paths that allow the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, the volatile memory is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid-state storage devices. Operating system 122 may take several forms, such as various known proprietary operating systems or open-source Portable Operating System Interface type operating systems that employ a kernel. The code included in code block 145 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, haptic devices, and other such output devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications, including input devices. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101) and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

According to the present embodiment, the task-oriented conversational agent 107 may be a program capable of holding a natural language conversation with a user. The task-oriented conversational agent 107 may comprise a conversation module that governs the natural language conversation functionality of software agent synthesis program 108, and which includes a set of components that perform several key functions. Responsibility for performing these key functions may be divided up among the components differently in different embodiments of task-oriented conversational agent 107, but these functionalities may include input recognition, natural language understanding, dialogue management, task management, output generation, and output rendering. Input recognition may be performed by an input recognition module which may record user utterances using one or more input devices and convert the user utterances into plain text. Natural language understanding may be performed by a natural language understanding module, which analyzes the plain text and extracts the text's semantic meaning. Dialogue management is performed by a dialogue manager, which keeps the history and state of the dialogue and manages the general flow of the natural language conversation based on the semantic meaning. Task management is executed by one or more task managers, which executing tasks within a specific task domain. Output generation is performed by an output generation module, which may create output in the form of a message to be communicated to the user. Lastly, output rendering is performed by an output renderer, which utilizes one or more output devices to render the created message in the real world and communicate the message to the user. The task-oriented conversational agent 107 may further comprise a user support module which executes actions on behalf of a user responsive to the conversation conducted by the conversation module, and which may comprise or be in communication with software agent synthesis program 108.

According to the present embodiment, the software agent synthesis program 108 may be a program enabled to synthesize new software agents based on natural language commands. The software agent synthesis program 108 may, when executed, cause the computing environment 100 to carry out a software agent synthesis process 200. The software agent synthesis process 200 may be explained in further detail below with respect to FIG. 2. The software agent synthesis program 108 may comprise a language model and a plurality of software agents. In embodiments of the invention, the software agent synthesis program 108 may be stored and/or run within or by any number or combination of devices including computer 101, end user device 103, remote server 104, private cloud 106, and/or public cloud 105, peripheral device set 114, and server 112 and/or on any other device connected to WAN 102. Furthermore, software agent synthesis program 108 may be distributed in its operation over any number or combination of the aforementioned devices.

Figure 2:
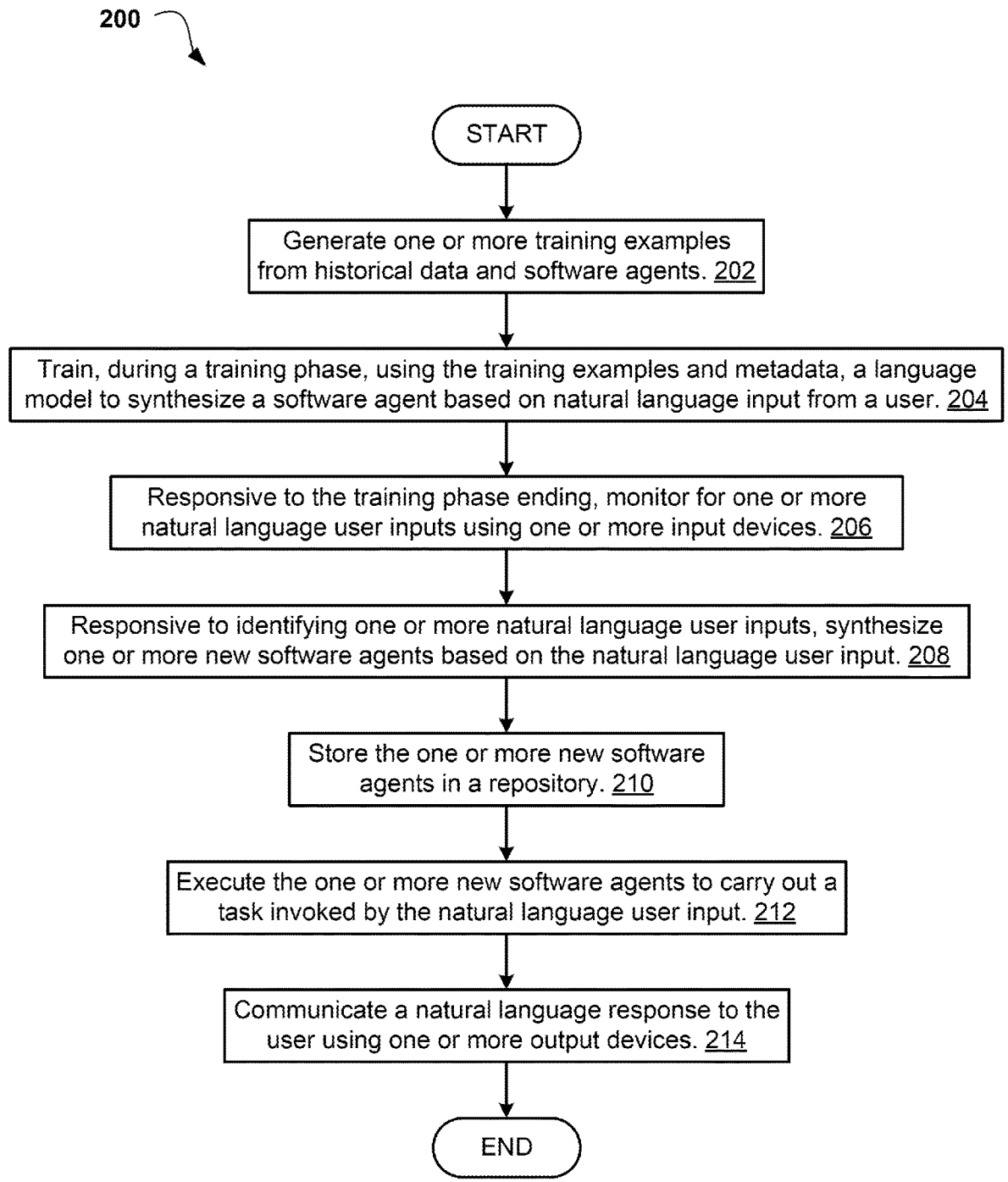
FIG. 2 is an operational flowchart illustrating a software agent synthesis process according to at least one embodiment.

Referring now to FIG. 2, an operational flowchart illustrating a software agent synthesis process 200 is depicted according to at least one embodiment. At 202, the software agent synthesis program 108 may generate one or more training examples from historical data and one or more software agents. The software agent synthesis program 108 may create YAML training examples from historical logs of actual users, and publicly available YAML files (git repositories) comprising the code of one or more software agents; the software agent synthesis program 108 may transform the phrases that invoke the software agents, or invocation phrases, into natural language sentences varying in complexity and in number/type of software agents invoked to provide a range of complex user queries. The software agent synthesis program 108 may also create YAML training examples using handcrafted prompts to provide additional coverage of automation use-cases.

At 204, the software agent synthesis program 108 may train, during a training phase, using the training examples and metadata, a language model to synthesize a software agent based on natural language input from a user. The software agent synthesis program 108 may initially train the language model during the training phase with historical user utterances, code of existing software agents, and metadata such as user profiles. In some embodiments of the invention, the training phase may be a stage of operation during which the software agent synthesis program 108 trains the language model by providing input parameters and sanitized data; the software agent synthesis program 108 provides training data as inputs until the output satisfies some threshold accuracy, at which point the training step is over. In some embodiments of the invention, the software agent synthesis program 108 may train the language model on YAML training examples.

At 206, the software agent synthesis program 108 may, responsive to the training phase ending, monitor for one or more natural language user inputs using one or more input devices. In some embodiments of the invention, the software agent synthesis program 108 may determine that the training phase is over, and that the inference phase has begun. The software agent synthesis program 108 may determine that the training phase is over based on one or more evaluation metrics such as reaching a threshold accuracy or reaching a plateau in accuracy improvement of the language model, for example where the accuracy on a validation set has not changed for more than 10 training epochs; the software agent synthesis program 108 may additionally or alternatively determine that the training phase is over based on receiving an admin signal and/or upon receiving an input from a user. The inference phase may be a stage of operation after the training phase during which the software agent synthesis program 108 is "live" and receives new user utterances. During the inference phase, the software agent synthesis program 108 may monitor, using input devices, for new user utterances in real-time or near-real-time. the input devices may be one or more electronic sensors capable of measuring and recording natural language communicated by a user. Natural language may be any language that has evolved naturally in humans through use and repetition without conscious planning or premeditation, as opposed to constructed and formal languages devised for a specific purpose, such as programming computers or studying logic; natural languages may comprise gestures, sign language, spoken and written speech, et cetera. User utterances, or user input, may comprise discrete natural language communications articulating a command or query making a demand or request to the software agent synthesis program 108 and which are received by the software agent synthesis program 108 from the user. A dialogue comprising multiple user utterances and associated responses from the software agent synthesis program 108 may be herein referred to as a conversation. The sensors may comprise microphones for recording audible speech, cameras for recording gestures or signs, tablets or capacitive touchscreens for recording touch including writing, keyboards for recording text input, et cetera.

At 208, the software agent synthesis program 108 may, responsive to identifying one or more natural language user inputs, synthesize one or more new software agents based on the natural language user input. Upon detecting a user utterance, the software agent synthesis program 108 may provide the user utterance as input to the language model. The language model may output synthesized software agents. In other words, synthesizing a new software agent may comprise passing user prompts for personalization through the language model to obtain new software agent definitions. In some embodiments, the software agent synthesis program 108 may identify the user from which the user utterance originated, for example by facial recognition coupled with acoustic source detection, voice identification, passwords, prompts, et cetera, and may retrieve a profile associated with the identified user which is provided to the language model as input along with the user utterance.

At 210, the software agent synthesis program 108 may store the one or more new software agents in a repository. When a new software agent is synthesized, the software agent synthesis program 108 may prompt the user for an invocation phrase to associate with the newly synthesized software agent. Responsive to the user providing the invocation phrase, the software agent synthesis program 108 may store the newly synthesized software agent and its associated invocation phrase in a repository of software agents. In some embodiments of the invention, the software agent synthesis program 108 may associate the newly synthesized software agent with the user for whom it was created, or author user, for example by appending metadata to the newly synthesized software agent specifying the author user, or by storing the newly synthesized software agent in a repository associated with the author user. In some embodiments of the invention, synthesized software agents associated with an author user may be shared or otherwise made available to one or more users besides the author user.

At 212, the software agent synthesis program 108 may execute the one or more new software agents to carry out a task invoked by the natural language user input. Here, the software agent synthesis program 108 may run the one or more software agents invoked by the user utterance. The software agents may proceed to execute their pre-programmed tasks, for example by modifying data in a web service or site, prompting the user for input, operating a mechanical device in connection with the network, et cetera.

At 214, the software agent synthesis program 108 may communicate a natural language response to the user using one or more output devices. In some embodiments of the invention, the software agent synthesis program 108 may respond to the user utterance using natural language. The software agent synthesis program 108 may operate or be integrated with one or more output devices, which may comprise a number of devices for communicating natural language to the user. These output devices may include speakers for communicating audible speech, display devices for communicating written speech or reproducing gestures or sign languages, haptic vibration motors or other vibration devices for generating haptic feedback, or a robotic hand for reproducing gestures or sign languages. The software agent synthesis program 108 may respond to the user utterance in the same format as the user utterance. For example, if the user utterance comprised audible speech, the software agent synthesis program 108 may respond with audible speech. If the user utterance comprised sign language, the software agent synthesis program 108 may respond in sign language. The software agent synthesis program 108 may utilize the output generation functionality of the task-oriented conversational agent 107 to create the output and may utilize the output rendering functionality to render the created response in the real world and communicate the message to the user.

It may be appreciated that FIG. 2 provides only an illustration of one implementation and does not imply any limitations with regard to how different embodiments may be implemented. Many modifications to the depicted environments may be made based on design and implementation requirements.

The descriptions of the various embodiments of the present invention have been presented for purposes of illustration but
 are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A processor implemented method for software agent synthesis, the method comprising:
    generating one or more training examples comprising natural language sentences from historical data paired with code of a plurality of software agents that the natural language sentences invoke, wherein the code is written in a domain-specific programming language;
    training, using the one or more training examples, a language model to synthesize a new software agent based on a natural language input from a user; and
    during an inference phase:
        monitoring, using one or more input devices, for one or more natural language inputs;
        responsive to identifying one or more natural language inputs, inferring, from the one or more natural language inputs, one or more functionalities that the user desires;
        synthesizing, by the trained language model, a plurality of code describing the new software agent that performs the one or more inferred functionalities, wherein the synthesized code comprises a combination of the code of a first software agent and the code of a second software agent; and
        executing the synthesized code to perform, by the new software agent, the one or more functionalities.

2. The method of claim 1, further comprising;
    storing the new software agent in a repository accessible to one or more users.

3. The method of claim 1, further comprising:
    communicating a natural language response to the user using one or more output devices.

4. The method of claim 1, wherein the language model is further trained on a plurality of metadata.

5. The method of claim 1, further comprising:
    responsive to synthesizing the new software agent, prompting the user to provide an invocation phrase associated with the new software agent.

6. The method of claim 1, wherein the language model is further trained using a mixture of in-context and prompt driven learning.

7. A computer system for software agent synthesis, the computer system comprising:
- one or more processors, one or more computer readable memories, one or more computer readable tangible storage medium, and program instructions stored on at least one of the one or more tangible storage medium for execution by at least one of the one or more processors via at least one of the one or more memories, wherein the computer system is capable of performing a method comprising:
  - generating one or more training examples comprising natural language sentences from historical data paired with code of a plurality of software agents that the natural language sentences invoke, wherein the code is written in a domain-specific programming language;
  - training, using the one or more training examples, a language model to synthesize a new software agent based on a natural language input from a user; and
  - during an inference phase:
    - monitoring, using one or more input devices, for one or more natural language inputs;
    - responsive to identifying one or more natural language inputs, inferring, from the one or more natural language inputs, one or more functionalities that the user desires;
    - synthesizing, by the trained language model, a plurality of code describing the new software agent that performs the one or more inferred functionalities, wherein the synthesized code comprises a combination of the code of a first software agent and the code of a second software agent; and
    - executing the synthesized code to perform, by the new software agent, the one or more functionalities.

8. The computer system of claim 7, further comprising;
storing the new software agent in a repository accessible to one or more users.

9. The computer system of claim 7, further comprising:
communicating a natural language response to the user using one or more output devices.

10. The computer system of claim 7, wherein the language model is further trained on a plurality of metadata.

11. The computer system of claim 7, further comprising:
responsive to synthesizing the new software agent, prompting the user to provide an invocation phrase associated with the new software agent.

12. The computer system of claim 7, wherein the language model is further trained using a mixture of in-context and prompt driven learning.

13. A computer program product for software agent synthesis, the computer program product comprising:
- one or more computer readable tangible storage medium and program instructions stored on at least one of the one or more tangible storage medium, the program instructions executable by a processor to cause the processor to perform a method comprising:
  - generating one or more training examples comprising natural language sentences from historical data paired with code of a plurality of software agents that the natural language sentences invoke, wherein the code is written in a domain-specific programming language;
  - training, using the one or more training examples, a language model to synthesize a new software agent based on a natural language input from a user; and
  - during an inference phase:
    - monitoring, using one or more input devices, for one or more natural language inputs;
    - responsive to identifying one or more natural language inputs, inferring, from the one or more natural language inputs, one or more functionalities that the user desires;
    - synthesizing, by the trained language model, a plurality of code describing the new software agent that performs the one or more inferred functionalities, wherein the synthesized code comprises a combination of the code of a first software agent and the code of a second software agent; and
    - executing the synthesized code to perform, by the new software agent, the one or more functionalities.

14. The computer program product of claim 13, further comprising;
storing the new software agent in a repository accessible to one or more users.

15. The computer program product of claim 13, further comprising:
communicating a natural language response to the user using one or more output devices.

16. The computer program product of claim 13, wherein the language model is further trained on a plurality of metadata.

17. The computer program product of claim 13, further comprising:
responsive to synthesizing the new software agent, prompting the user to provide an invocation phrase associated with the new software agent.

\* \* \* \* \*